March 5, 1963  C. R. HICKMAN  3,080,188
EXTENSION ATTACHMENT TO CONVERT A VEHICLE CAB
INTO A SLEEPING COMPARTMENT
Filed Aug. 17, 1959
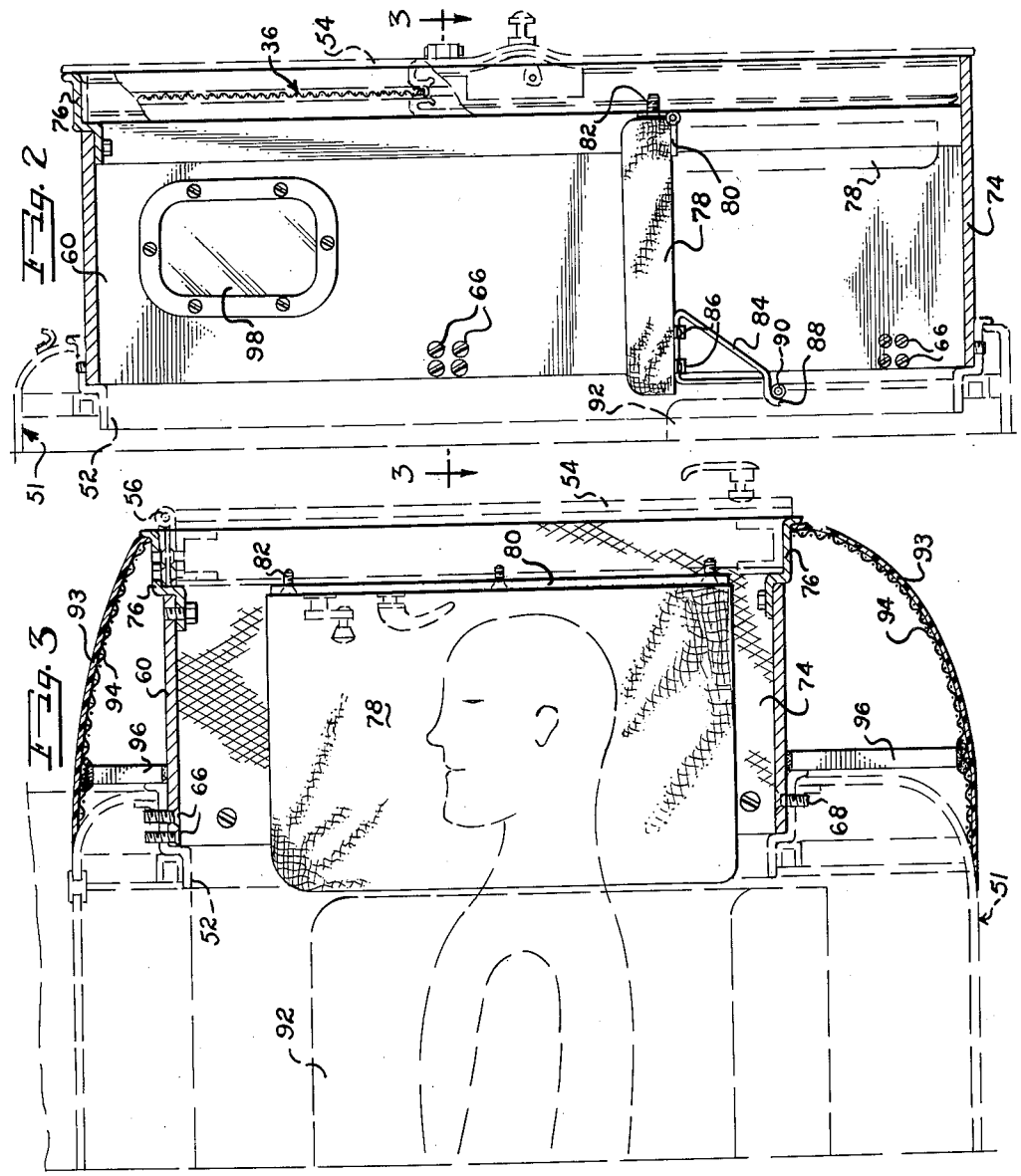
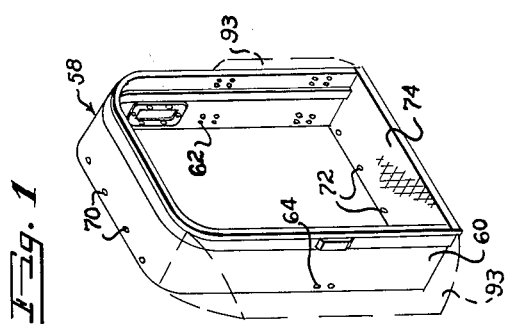
CHARLES R. HICKMAN
INVENTOR.
BY
Wayland D. Keith
HIS AGENT United States Patent Office 3,080,188
Patented Mar. 5, 1963

3,080,188
EXTENSION ATTACHMENT TO CONVERT A VEHICLE CAB INTO A SLEEPING COMPARTMENT
Charles R. Hickman, Wichita Falls, Tex., assignor to Wayland D. Keith, Wichita Falls, Tex.
Filed Aug. 17, 1959, Ser. No. 834,273
3 Claims. (Cl. 296—23)

This invention relates to improvements in vehicle bodies, and more particularly to the conversion of said vehicle bodies, such as truck cabs and the like into temporary sleeping quarters for the operator of the vehicle.

Various proposals have been made, heretofore, for providing sleeping accommodations in trucks and the like, however, these usually consisted of a large cumbersome housing rearward of the cab, either separate therefrom or built integral therewith. Either of which arrangements utilized valuable wheel base space of the motor vehicle. Furthermore, such compartments, when closed, confined the occupant to such an extent that the vehicle could actually be in flames and the occupant would be unable to escape.

The present invention enables a conventional cab of a motor vehicle, such as a truck, to be converted from a driving compartment into a sleeping compartment, in a minimum of time and in a manner to insure the comfort of the sleeper, who can recline completely, but without the danger of being encased within a separate compartment.

The present invention further provides for the enclosing of the sleeping compartment in such manner as to exclude water and insects therefrom.

The invention provides a cab extension, whereby the seating space may be extended on one or both sides of the cab in such manner as to accommodate greater seating space on the cab seat, as well as to permit the operator to recline thereon in comfort, which construction does not interfere with visibility from the cab, or detract from the appearance thereof, and without extending the width of the cab beyond the legal limit of the truck width.

An object of this invention is to provide for the conversion of a vehicle cab into a sleeping compartment which is substantially weather and insect tight, and in which a person can sleep in a reclining position.

Yet another object of the invention is to provide a padded cushion member, which is attached to the door of the truck, which cushion member will hang in a vertical position between the door and the existing cushion, when the door is closed, but which may be supported in a horizontal position by an interlocking support brace between the seat frame and the door, so as to hold the door in a spaced open relation, when the cab is converted into a sleeping compartment.

Still another object of the invention is to provide for vehicle body conversion, whereby a rigid extension may be secured to the vehicle body in such manner as to move the door thereof a predetermined distance outward from the vehicle body.

A yet further object of the invention is to provide for vehicle body conversion, whereby a door frame extension member is attachably connected within the existing door opening of the vehicle cab so that the door thereof may be extended outward a predetermined distance, and wherein a cushion member may be attachably connected to said door to extend between said door and the end of the existing cushion, to form an extension for said cushion member.

A still further object of the invention is to provide a cushion extension member for the existing cushion of the cab seat, which extension is at a raised elevation above the existing cushion, in a manner to form a pillow at the end of said cushion.

Another object of the invention is to provide for the conversion of the body of a truck cab, whereby the contours of the body may be rounded out and so finished as to present a body which does not appear to have a temporary extension thereon.

With these objects in mind and others which will become manifest as the description proceeds, reference is to be had to the accompanying drawings, in which like reference characters designate like parts in the several views thereof, in which:

FIG. 1 is a perspective view of a vehicle cab extension member, shown in full outline, and showing Fiberglas or the like, which is shaped therearound, in dashed outline, so as to be connected with the cab;

FIG. 2 is a fragmentary elevational view of a vehicle body conversion, the vehicle body being shown in dashed outline, and the components of the vehicle body conversion being shown in full outline; with certain parts being broken away or shown in section to bring out the details of construction;

FIG. 3 is a sectional view taken on the line 3—3 of FIG. 2, looking in the direction indicated by the arrows, and showing the vehicle body conversion members in full outline and showing the conventional body members in dashed outline.

This invention relates to a device which converts a vehicle body, such as a cab, truck or the like, into a temporary sleeping quarters for the operator of the vehicle. The conversion is a semi-permanent addition to the vehicle body, such as to the cab of a truck or the like, which gives additional room in the cab of the truck, without detracting from the advantages of the rigid truck cab.

The conventional truck cab, designated generally at 51, and shown in dashed outline in FIGS. 2 and 3, and has a door opening 52 therein, in which opening the door 54 is normally positioned, to be hingeably mounted therein on hinges 56. However, a rigid, tunnel-shaped, cab extension member, designated generally at 58, as shown in FIG. 1, is provided, which is of a size and shape to fit snugly within the door opening 52 and to extend outward the desired distance, which is usually sixteen to eighteen inches, and still be within the legal limits for road width, and can usually be within the confines of the body width of the truck which is used for hauling cargo. The extension member, designated generally at 58, is composed of a width of metal 60, which, when fitted into the door opening, has holes 62 therein, which holes will register with respect to hinge holes on one side and holes 64 on the opposite side, which will normally register with the latch holes, so screw bolts 66 and 68 may be fitted within the respective holes in the width of metal 60 so as to extend into the holes normally within the body of truck cab 51, so they may threadably engage therewith. Holes 70 and 72, within the width of metal 60 which forms a band, also receive screws therethrough, which extend into the cab 51 of the truck body, so as to form a rigid, quickly detachable unit, which unit may be readily detached when desired.

The lower portion of member 58 has a floor plate 74 secured therein, which extends outward to the outer edge, so as to afford a tight closure with the door 54.

The door 54 is hingeably connected to a body mold member 76, which member 76 is complementary in size and shape to the mold member surrounding door opening 52, therefore, with the member 76 being fitted in extension member 58, the door 54 will fit in tight relation therewith. The inside of the door 54 usually has a panel therein, in the lower half of which screw threaded holes are present. An accessory cushion extension member, designated by the numeral 78 is rectangular in form and has a hinge 80 screw threaded thereon and to the other side of which hinge 80 is connected the door 54, by screws 82. A support bracket 84 is hinged to the lower side of accessory cushion extension member 78 by means of clip members 86, so the support brace 84 may be moved into the position as shown in full outline in FIG. 2. An existing cushion 92 is positioned in the cab cab 51 and a brace member 90 is positioned in the cab at the end of existing cushion 92. The support brace 84 has a hook portion 88 thereon which is adapted to engage the brace member 90 to support the accessory cushion extension member 78 in a horizontal position. It is preferable to have the cushion 78 supported at a higher elevation, when in horizontal position, than the upper face of existing cushion 92, so as to provide a pillow for the individual reclining thereon.

The brace member 84 will hinge into close fitting relation with the bottom of cushion 78, which will enable the cushion to move from the position as shown in full outline in FIGS. 2 and 3, to the position as shown in dashed outline in FIG. 2, whereby, added storage space is provided within cab 51, or if desired, the accessory cushion extension member 78 may be raised to horizontal position, to serve as additional seating space.

If it is desired to leave the cab extension member 58 on the cab 51 over a period of some months, a plastic or Fiberglas covering 93 may be built upon a screen member 94, so as to round out the contours of body 51, which Fberglas and screen construction may be held in fixed relation to the width of metal 60, which forms the sides of cab extension member 58, by braces 96. It is preferable to have the portion of the cab contoured thereinto, both at the top, side and bottom, as will best be seen in dashed outline in FIG. 1. However, it is preferable to have the forward portion of the Fiberglas extension to extend upward approximately halfway of the cab extension member 58, so as to enable a transparent window 98 to be fitted in the forward side of the cab extension member 58, which will give the driver a view outward therethrough.

In view of the fact that a cab of this construction permits very little circulation of air, a screen 36 is installed within the channels for the glass, and is above the door glass, when the glass is lowered.

The outline of an individual is shown in dashed lines, in reclining position on the cushion 92, with the head resting on the accessory cushion extension member 78, which is attached to the door 54.

While the invention has been shown and described at some length, for particular installation, it is to be understood that changes may be made in the minor details of construction, and adaptations made to the requirements of vehicles of different model and body design, may be made without departing from the spirit of the invention or the scope of the appended claims.

Having thus clearly shown and described the invention, what is claimed as new and desired to secure by Letters Patent is:

1. A cab extension member for converting the cab of a motor vehicle into a sleeping compartment, which cab has a cushion therein, a support bracket in the cab at the end of said cushion, which sleeping compartment comprises a rigid, cab extension member having a top, bottom and sides, which member has inner and outer open ends forms thereby, which member is adapted to complementally fit within a door opening of said cab of said motor vehicle, means attachably securing said cab extension member within said door opening, which open outer end of said cab extension member is corresponding in size and shape to said door opening in said cab of said motor vehicle, a complementary member fitted on the open outer end of said cab extension member to complementally receive a door therein, a door fitted in said complementary member in said open outer end of said cab extension member, a cushion extension member hingeably secured to the inside of said door and extending horizontally inward, when the cushion extension member is in one position, into close proximity with said cushion of said cab, which hinged cushion extension member is movable from a horizontal position to a position in parallel relation with the inside of said door, a foldable brace member pivotally mounted on the lower side of said cushion extension member, and means on said brace member to interengage the support bracket in said cab to support said cushion extension member in said horizontal position.

2. A device as set forth in claim 1, wherein said cushion extension member hinged to said door is supported at an elevation in a higher plane than the upper face of the existing cushion in said cab.

3. A device as defined in claim 1, wherein a contoured, rigid, formable material is secured to the outer end of said cab extension member and to said body, and wherein brace means are provided to secure said rigid, formable material in spaced relation with respect to said cab extension member.

References Cited in the file of this patent
UNITED STATES PATENTS

| | | |
|---|---|---|
| D. 168,440 | Flatt | Dec. 23, 1952 |
| 1,244,823 | Anderson | Oct. 30, 1917 |
| 2,012,193 | Heinsen | Aug. 20, 1935 |
| 2,122,681 | Dykes | July 5, 1938 |
| 2,174,499 | Kounkel | Sept. 26, 1939 |
| 2,493,368 | Smelker | Jan. 3, 1950 |
| 2,568,800 | Galla | Sept. 25, 1951 |
| 2,661,233 | Sidel | Dec. 1, 1953 |
| 2,743,772 | Peck | May 1, 1956 |
| 2,756,093 | Boger | July 24, 1956 |
| 2,782,068 | Esche | Feb. 19, 1957 |
| 2,821,427 | Hairston | Jan. 28, 1958 |

FOREIGN PATENTS

| | | |
|---|---|---|
| 882,853 | France | Oct. 4, 1937 |
| 480,411 | Italy | Apr. 23, 1953 |